April 22, 1958   A. BAERFUSS   2,831,665
AGITATOR VATS
Filed June 1, 1956

INVENTOR
ACHILLES BAERFUSS

BY Wenderoth, Lind & Ponack
Attys.

United States Patent Office 2,831,665
Patented Apr. 22, 1958

2,831,665

AGITATOR VATS

Achilles Baerfuss, Oberwil, near Basel, Switzerland, assignor to HCH Bertrams A. G., Basel, Switzerland, a Swiss company Application June 1, 1956, Serial No. 588,815

Claims priority, application Switzerland May 9, 1956

5 Claims. (Cl. 259—107)

My present invention relates to improvements in agitator vats having a rotary agitating element and a scraping means rotating therewith, which latter comprises at least one scraper for scraping the vat wall.

In the agitator vats of the type indicated known so far, the scrapers are sheet metal members which are secured to the agitating element. Since welded vat walls never are truly round but in the contrary show differences of up to ¾ inch, the scrapers can be adjusted only to the highest point of the vat wall. Therefore, large areas of the vat wall are not engaged in operation, and this fact is detrimental to the mixing operation. Another disadvantage of agitator vats comprising such scrapers is that they can rotate in one direction only.

Said disadvantages are eliminated in the agitator vat disclosed by my present invention, by the fact that the scraper comprises an elongated rollable scraping member detained in a chamber formed by a portion of said scraper and the vat wall and extending in the vertical direction of the latter. Said scraping member in operation is urged, by a skewface thereof, wedgelike towards the vat wall.

One embodiment of my invention is shown, by way of example, in the accompanying drawing, in which—

Figure 1:
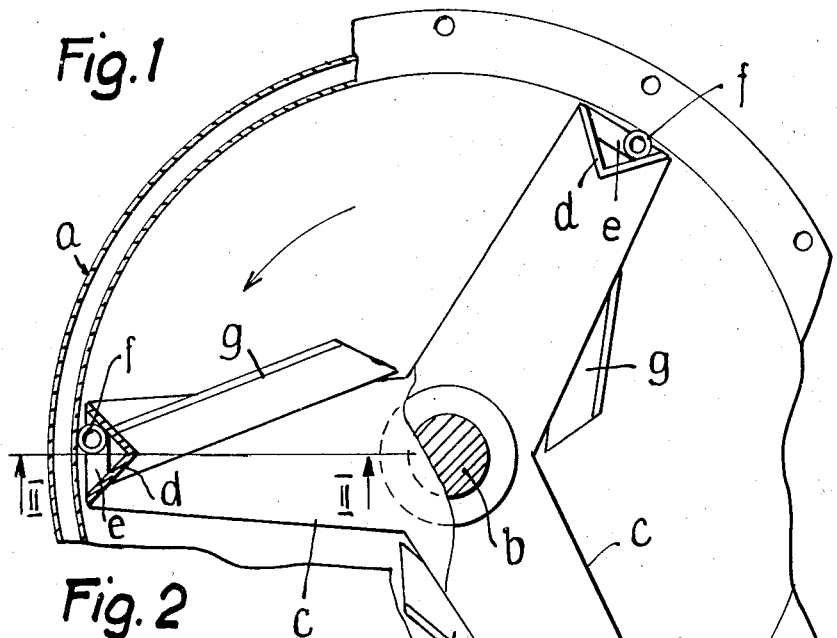
Figure 2:
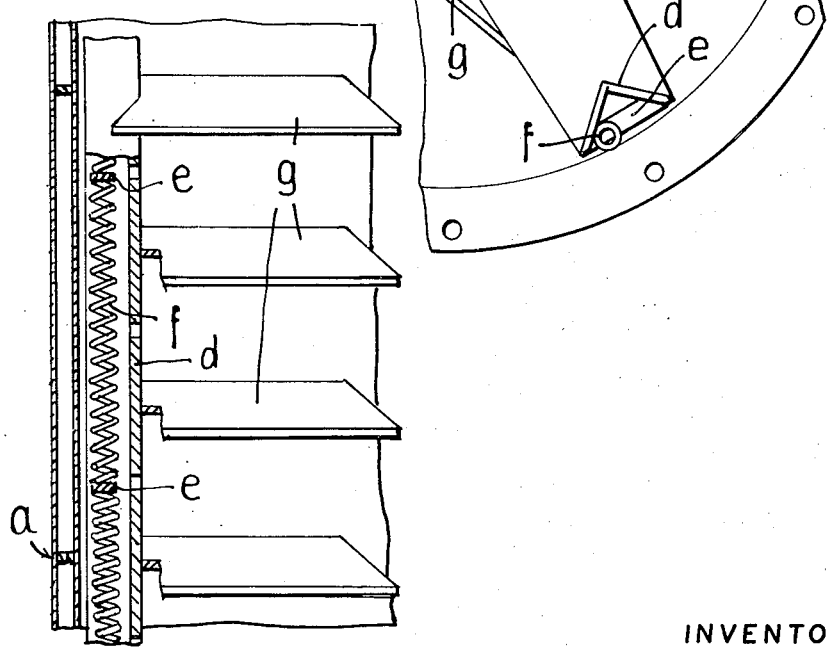

Fig. 1 shows a top view of an uncovered agitator vat with parts broken away, and Fig. 2 is a section on the line II—II of Fig. 1.

In Fig. 1, $a$ designates a cylindrical jacketed vat into which is built an agitator mechanism. The latter comprises a vertical rotary shaft $b$ to which are secured an upper and a lower supporting spider $c$. The ends of the superposed arms of said two spiders are interconnected by means of angle irons $d$ of which the open sides face the vat wall to form a plurality of elongated chambers extending vertically of the latter. As can be seen most clearly in Fig. 1, the trailing sides of the angle irons $d$ form surfaces which are at an acute angle to the direction of movement of the rotary element during its rotation. Said chambers formed by cross pieces $e$ welded to the angle irons are subdivided into a plurality of spaces in each of which is loosely placed a helical spring $f$ which forms an elongated rollable scraping member extending between cross pieces $e$. To the angles $d$ are secured obliquely-sloping stirring blades $g$ which from their points of attachment extend obliquely to the interior.

When the agitator mechanism rotates, the helical springs $f$ are taken along by the trailing sides of the angle irons $d$ and urged wedgelike towards the vat wall by said trailing sides so that the latter is scraped on its entire circumference irrespective of any irregularities in its diameter; and this also holds true when said mechanism rotates in the opposite sense.

What I claim as new and desire to secure by Letters Patent, is:

1. In an agitator vat, the combination of a rotary agitating element, vat wall scraping means on the rotary element comprising a chamber forming portion for defining with the vat wall an elongated chamber extending vertically of the vat wall, said chamber forming portion having a surface thereof at an acute angle to the direction of rotation of the rotary element, and an elongated rollable scraping member in the elongated chamber, said scraping member being urged against the vat wall by said acute angle surface during rotation of the rotary element.

2. The combination as claimed in claim 1 in which said chamber forming portion is a length of angle iron.

3. The combination as claimed in claim 1 and a vertical shaft rotatably mounted in the agitator vat, an upper and a lower supporting spider mounted on said shaft, and angle irons connecting the corresponding spider arms of said upper and lower spiders, said angle irons comprising said chamber forming portions.

4. The combination as claimed in claim 3 and stirring blades secured to said angle irons and directed obliquely inwardly therefrom.

5. The combination as claimed in claim 1 in which said scraping member comprises a helical spring.

References Cited in the file of this patent

UNITED STATES PATENTS

| | | |
|---|---|---|
| 1,997,035 | Arbuckle | Apr. 9, 1935 |
| 2,575,374 | Walsh | Nov. 20, 1951 |
| 2,758,451 | Lauterbach | Aug. 14, 1956 |